United States Patent [19]

de Montigny et al.

[11] 4,260,715
[45] Apr. 7, 1981

[54] PROCESS FOR THE PRODUCTION OF SILICONFUNCTIONAL POLYORGANOSILOXANES

[75] Inventors: Armand de Montigny, Leverkusen; Hans Niederprüm, Monheim, both of Fed. Rep. of Germany

[73] Assignee: Bayer Aktiengesellschaft, Leverkusen, Fed. Rep. of Germany

[21] Appl. No.: 101,317

[22] Filed: Dec. 7, 1979

[30] Foreign Application Priority Data

Dec. 23, 1978 [DE] Fed. Rep. of Germany ....... 2855927

[51] Int. Cl.³ .............................................. C07F 7/08
[52] U.S. Cl. .................................. 556/453; 556/456; 556/462
[58] Field of Search ................. 260/448.2 E; 556/453, 556/462, 456

[56] References Cited

U.S. PATENT DOCUMENTS

| | | | |
|---|---|---|---|
| 4,044,038 | 8/1977 | Rossmy | 260/448.2 E |
| 4,073,801 | 2/1978 | Moretto et al. | 260/448.2 E |
| 4,177,201 | 12/1979 | Montigny et al. | 260/448.2 E |

*Primary Examiner*—Paul F. Shaver
*Attorney, Agent, or Firm*—Sprung, Felfe, Horn, Lynch & Kramer

[57] ABSTRACT

In the production of linear and branched equilibrated acyloxy-containing organopolysiloxanes by reacting a chlorosilane of the formula

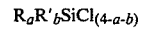

$R_aR'_bSiCl_{(4-a-b)}$ in which a is 0,1,2 or 3,
b is 0,1,2 or 3, and
$a+b \leq 3$, or a partial hydrolysate thereof, with at least one organosiloxane containing the components $R_2R''$—SiO$_{\frac{1}{2}}$, R R''—SiO, R''—SiO$_{3/2}$ and SiO$_2$ in which
R and R'' each independently is H or an optionally halogen- or cyano-substituted monovalent hydrocarbon radical having up to 12 carbon atoms, and R'' is Cl, OH, H or an optionally halogen- or cyano-substituted monovalent hydrocarbon radical having up to 12 carbon atoms, in the presence of an equilibration catalyst, the improvement which comprises employing as the equilibration catalyst a salt of a fluorinated alkane sulphonic acid plus a monobasic carboxylic acid, the total number of Si—Cl groups exceeding the total number of Si—OH groups in the reactants and the monobasic carboxylic acid being present in at least about 1.1 times the molar amount of silicon-bound Cl atoms. Advantageously the salt of the fluorinated alkane sulphonic acid is the potassium salt of octafluorobutane sulphonic acid and it is used in about 0.3 to 0.7% by weight of the silicon compound reactants. The equilibration is effected at a temperature up to about 135° C., and the monobasic carboxylic acid is acetic acid.

6 Claims, No Drawings

PROCESS FOR THE PRODUCTION OF SILICONFUNCTIONAL POLYORGANOSILOXANES

The present invention relates to the production of linear or branched silicon-functional polyorganosiloxanes by the so-called equilibration of chlorosiloxanes in the presence of a combination of catalytic quantities of salts of fluorinated organosulphonic acids and monobasic carboxylic acids such as acetic acid or propionic acid.

Linear and branched silicon-functional polyorganosiloxanes such as siloxanes having terminal Si-bound chlorine atoms or acetoxy radicals may be used as the starting materials for many organopolysiloxane-containing materials as they are suitable for reaction with reactive hydrogen atoms of the type which are present, for example in alcohols, amines and many other compounds. Thus, they are suitable, among other things, for the production of polyether-polysiloxane mixed polymers which have had a wide commercial application, for example as stabilizers for the production of polyurethane foam, owing to their interface-active properties, as well as other mixed polymers in block form. Up until now, the experiments to produce silicon-functional polyorganosiloxanes concentrated mainly on the production of chlorine-containing organopolysiloxanes either by the incomplete hydrolysis of organochlorosilanes (cf. for example, U.S. Pat. No. 2,381,366, German Auslegeschrift No. 1,174,509, German Offenlegungsschrift No. 2,345, 923) or by the reaction of chlorosilanes with mainly cyclic siloxanes in the presence of catalyst such as FeCl₃ and/or HCl (U.S. Pat. No. 2,421,653) or phosphine oxides (U.S. Pat. No. 3,162,662). Quaternary ammonium salts are also used for opening the ring of cyclic trisiloxanes in the presence of chlorosilanes, in order to obtain chlorosiloxanes (U.S. Pat. No. 3,162,662). Catalyst mixtures such as a hydrogen halide/protonic-acid equilibration catalyst (German Offenlegungsschrift No. 2,453,482) or hydrogen halides/peralkylated acid amide (German Offenlegungsschrift No. 2,353 166) have been described more recently in connection with the reaction of organochlorosilanes with polyorganosiloxanes.

The present invention relates to a process for the production of linear and branched equilibrated mixed acyloxy-containing and chlorine-containing organopolysiloxanes by the reaction of a chlorosilane corresponding to the following general formula:

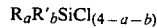

or partial hydrolysates thereof, wherein
a represents 0,1,2 or 3,
b represents 0,1,2 or 3, and
a+b is at most 3,
with one or more organoslioxanes, which can contain the following components in an optionally varying arrangement:

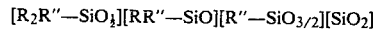

wherein R and R' which may be the same or different, represent hydrogen, and aliphatic, aromatic, saturated or unsaturated, optionally halogen-substituted or cyano-substituted monovalent hydrocarbon radical having up to 12 carbon atoms and R" represents chlorine or hydroxyl, or has the meaning given for R and R',
in sufficient proportions for the number of all Si—Cl-groups invariably to exceed the number of all Si—OH-groups, which is characterized in that the reaction is carried out in the presence of a combination of a salt of a fluorinated alkane-sulphonic acid and, based on the silicon-bound chlorine atoms, at least a 1.1-fold molar quantity of a concentrated monobasic carboxylic acid, in particular acetic acid, at a temperature of up to a maximum of about 135° C.

It has surprisingly been found that, unlike salts of sulphuric acid, the salts of the fluorinated alkane sulphonic acids are excellent equilibration catalysts in the above process. The use of salts of fluorinated alkane sulphonic acids also has the advantage that the salts are produced as an intermediate stage in the production of this acid so that these catalysts can be produced more easily than the corresponding acids.

Salts of perfluoroalkane sulphonic acid

wherein $R_F$ represents perfluorinated alkyl radical having up to 12 carbon atoms, are preferably used in a quantity of about 0.05 to 1.5% by weight, preferably about 0.3 to 0.7% by weight. The $CF_3$-, $C_4F_9$-, or $C_8F_{17}$-radical, for example, can be used as the $R_F$ radical. The percentages relate to the silicon compounds present.

Salts of incompletely fluorinated acids such as

can also be used. Potassium is preferred as the Me radical, but Na, Ca- or other metal ions are also suitable.

Suitable silanes include trimethylchlorosilane, dimethylvinylchlorosilane, dimethylphenylchlorosilane, chloropropyldimethylchlorosilane, chloromethyldimethylchlorosilane, bromomethyldimethylchlorosilane, dimethyldichlorosilane, methylvinyldichlorosilane, methylphenyldichlorosilane, 3,3,3-trifluoropropylmethyldichlorosilane, diphenyldichlorosilane, chloropropylmethyldichlorosilane, methyltrichlorosilane, chloromethylmethyldichlorosilane, bromomethylmethyldichlorosilane, methyltrichlorosilane, chloromethyltrichlorosilane, vinyltrichlorosilane, phenyltrichlorosilane and silicon tetrachloride.

Preferred siloxanes include the direct hydrolysates of dimethyldichlorosilane, of the type manufactured industrially as a preliminary stage in the production of the cyclic siloxanes as well as the siloxanes:

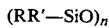

wherein n represents 3 to 5 and R and R' are defined as above. Any linear and branched siloxanes, the mode of production of which is known to those skilled in the art are particularly suitable. These siloxanes can also contain silicon-functional groups such as Si—OH or Si—Cl groups or also lateral organo functional groups such as Si-vinyl, —Si—CH₂Cl etc.

The process according to the present invention is generally carried out in such a way that the chlorosilane is mixed with the catalyst and this mixture is heated up to reflux (about 66° C.). After addition of the siloxane, the mixture is heated to about 90° C. and the carboxylic acid, preferably acetic acid is then added. The carboxylic acids should be as pure as possible and should not contain any compounds which can enter reactions, for example with SiCl- or SiOAc groups. The temperature is raised to about 120° to 130° C. so that reflux occurs. After stirring for about 2 to 5 hours at this temperature, volatile material is liberated by distillation (for example at 120° C. and 20 mbar).

The residue, which can appear colorless to slightly yellowish depending on the quality of the materials used, is clouded to a minimum extent by traces of insoluble salt. The product is a mobile, highly water-sensitive liquid.

The equilibration reaction stops immediately after the carboxylic acid has been removed (distillation under vacuum). The thorough heating of low molecular fractions such as octamethyl cyclotetrasiloxane thus becomes problem-free.

Continuous production is possible without further ado owing to the favorable reaction conditions as well as the short reaction times. Suitable monobasic carboxylic acids include, for example, acetic acid, propionic acid, or also higher carboxylic acids. Acetic acid is, however, preferred.

The present invention is described in more detail by the following example (percentages relate to percentages by weight, unless otherwise stated, D represents a difunctional unit —OSi(R)$_2$ and Ac represents the acetyl radical). The functional end groups are given in the form of mval H+ per 100 g.

NON-INVENTIVE COMPARISON EXAMPLES

EXAMPLE A 149.5 g [1 mol] methyltrichlorosilane are mixed with 11 g sodium sulphate and heated to 70° C. Reflux occurs. 1110 g [3.75 mol] octamethylcyclotetrasiloxane are added without interruption at this temperature. The mixture is then heated to 90° C. and 500 g [8.33 mol] acetic acid (100%) are added dropwise in 30 minutes. A strong HCl stream is produced. The mixture is carefully heated to about 125° C. (reflux) and stirred for 5 hours at this temperature.

The mixture is subsequently heated thoroughly to 90° C. and 20 mbar. 930 g volatile material are removed. About 350 g were expected.

A slightly cloudy residue remains (709 g).

An H-NMR-analysis demonstrated a

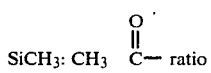

of 6.5:1, whereas a ratio of 10.3:1 was expected.

EXAMPLE B

In the process described in Example A, 11 g KHSO$_4$ were used instead of the same quantity of Na$_2$SO$_4$. 977.5 g volatile material were isolated.

H-NMR analysis of the slightly cloudy residue (691 g) demonstrated a

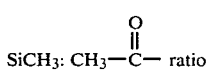

of 6.1:1.

The results given above show that salts of sulphuric acid have only an unsatisfactory equilibrating effect.

EXAMPLES ACCORDING TO THE PRESENT INVENTION

EXAMPLES 1 AND 2

129 g [1 mol] dimethyldichlorosilane are mixed with 2.3 g KO$_3$SC$_4$F$_9$ and heated to about 70° C. (reflux). 444 g [1.5 mol] octamethylcyclotetrasiloxane are added without interruption at this temperature. The mixture is then heated to 90° C. and 240 g [4 mol] acetic acid [100%] are added dropwise in 30 minutes. The mixture is heated in order to reflux and stirred for a further 3 hours at this temperature.

The mixture is subsequently heated at 120° C. and 20 mbar (Experiment 1) and 90° C. and 20 mbar (Experiment 2) to remove volatile components.

A slightly cloudy, yellowish colored product is formed, which deposits a fine sediment and becomes water-clear after standing for some time.

| Experiment 1 | 2 |
|---|---|
| Yield: 555 g | 570 g |
| Distillate: 177 g | 165 g |
| mval H+ per 100g: 285 | 285 |

| Gas chromatogram of the evaporated fraction (=vD) | | | |
|---|---|---|---|
| vD | % | 55.3 | 55.5 |
| D$_4$ | % | 1.364 | 2.50 |
| D$_5$ | % | 3.83 | 4.05 |
| D$_6$ | % | 1.26 | 1.13 |
| D$_7$ | % | 0.24 | 0.20 |
| AcOD$_n$Ac | | | |
| n = 1" | — | — | |
| n = 2" | | 4.3 | 5.4 |
| n = 3" | | 10.9 | 9.8 |
| n = 4" | | 12.5 | 10.8 |
| n = 5" | | 11.7 | 10.4 |
| n = 6" | | 10.4 | 9.3 |
| n = 7" | | 8.5 | 8.1 |
| n = 8" | | 7.0 | 7.0 |
| n = 9" | | 5.7 | 6.0 |
| n = 10" | | 4.6 | 5.2 |
| n = 11" | | 3.7 | 4.3 |
| n = 12" | | 3.2 | 3.6 |
| etc... | | | |

The chlorosiloxanes which are present in small quantities have not been considered in the analysis by the gas chromatogram.

EXAMPLE 3

149.5 g [1 mol] methyltrichlorosilane are mixed with 4.73 g CF$_3$SO$_3$K and heated to about 65° C. (reflux). 1110 g [3.75 mol] octamethylcyclotetrasiloxane are added without interruption at this temperature. The mixture is then heated to 90° C. and 500 g [8.33 mol] acetic acid (100%) are added dropwise in 30 minutes. A strong HCl stream is produced. The mixture is carefully heated to 125° C. The mixture is stirred for a further 3 hours at this temperature.

The mixture is thoroughly heated at 90° C. and 15 mbar.

Residue: 1280.4 g (slightly cloudy ≙ 96% of the theoretical yield

Distillate: 351 g

Analysis of residue: mval H+/100 g: 215 (theoretical yield: 225.6) of which 7.6 mval are HCl.

EXAMPLE 4

If the catalyst $CF_3SO_3K$ in Example 3 is replaced by 5.4 g $C_4F_9SO_3(C_2H_5)_4N$, the following result is retained:

Residue: 1251.7 g ≙ 94% of the theoretical yield
Distillate: 396 g.
Analysis Residue: mval H+/100 g: 214 of which 3 mval are HCl

EXAMPLE 5

If the catalyst $CF_3SO_3K$ in Example 3 is replaced by 5.05 g $C_4F_9SO_3K$, the following result is obtained at a thorough heating temperature of 120° C. and a pressure of 20 mbar:

Residue: 1255 g ≙ 94% of the theoretical yield
Distillate: 344 g
Analysis Residue: mval H+/100 g: 203

EXAMPLE 6

If the catalyst $CF_3SO_3K$ in Example 3 is replaced by 8.12 g $C_8F_{17}SO_3K$, the following result is obtained at a thorough heating temperature of 90° C. and a pressure of 17 mbar:

Residue: 1250 g ≙ 94% of the theoretical yield
Distillate: 392 g
Analysis residue; mval H+/100 g: 210

EXAMPLE 7

If the catalyst $CF_3SO_3K$ in Example 3 is replaced by 5 g $C_4HF_8SO_3K$, the following result is obtained at thorough heating temperature of 120° C. and a pressure of 20 mbar:
Residue: 1225 g ≙ 92% of the theoretical yield
Distillate: 352.5 g
Analysis Residue mval H+/100 g: 205

It will be appreciated that the instant specification and examples are set forth by way of illustration and not limitation, and that various modifications and changes may be made without departing from the spirit and scope of the present invention.

What is claimed is:

1. In the production of linear and branched equilibrated acyloxy-containing organopolysiloxanes by reacting a chlorosilane of the formula $$R_aR'_bSiCl_{(4-a-b)}$$

in which
a is 0,1,2 or 3,
b is 0,1,2 or 3, and
a+b≦3, or a partial hydrolysate thereof, with at least one organosiloxane containing the components $$R_2R''-SiO_{\frac{1}{2}},$$

$$RR''-SiO,$$

$$R''-SiO_{3/2} \text{ and}$$

$$SiO_2$$

in which
R and R'' each independently is H or an optionally halogen- or cyano-substituted monovalent hydrocarbon radical having up to 12 carbon atoms, and
R'' is Cl, OH, H or an optionally halogen- or cyano-substituted monovalent hydrocarbon radical having up to 12 carbon atoms, in the presence of an equilibration catalyst, the improvement which comprises employing as the equilibration catalyst a salt of a fluorinated alkane sulphonic acid plus a monobasic carboxylic acid, the total number of Si—Cl groups exceeding the total number of Si—OH groups in the reactants and the monobasic carboxylic acid being present in at least about 1.1 times the molar amount of silicon-bound Cl atoms.

2. A process according to claim 1, wherein the equilibration is effected at a temperature up to about 135° C.

3. A process according to claim 1, wherein the monobasic carboxylic acid is acetic acid.

4. A process according to claim 1, wherein the fluorinated alkane sulphonic acid salt is a salt of a perfluoroalkanesulphonic acid and is used in about 0.05 to 1.5% by weight of the silicon compound reactants.

5. A process according to claim 1, wherein the salt of the fluorinated alkane sulphonic acid is the potassium salt of octafluorobutane sulphonic acid and it is used in about 0.3 to 0.7% by weight of the silicon compound reactants.

6. A process according to claim 5, wherein the equilibration is effected at a temperature up to about 135° C., and the monobasic carboxylic acid is acetic acid.

* * * * *